(12) United States Patent
Alexander

(10) Patent No.: US 11,059,392 B1
(45) Date of Patent: Jul. 13, 2021

(54) PUSH BUTTON MECHANICAL SEAT ADJUSTMENT CONTROLS

(71) Applicant: Sears Manufacturing Co., Davenport, IA (US)

(72) Inventor: Daniel J. Alexander, Davenport, IA (US)

(73) Assignee: Sears Manufacturing Co., Davenport, IA (US)

( * ) Notice: Subject to any disclaimer, the term of this patent is extended or adjusted under 35 U.S.C. 154(b) by 0 days.

(21) Appl. No.: 16/854,050

(22) Filed: Apr. 21, 2020

(51) Int. Cl.
*B60N 2/12* (2006.01)
*B60N 2/24* (2006.01)
*B60N 2/68* (2006.01)

(52) U.S. Cl.
CPC .............. *B60N 2/12* (2013.01); *B60N 2/24* (2013.01); *B60N 2/686* (2013.01)

(58) Field of Classification Search
CPC ............ B60N 2/12; B60N 2/24; B60N 2/686
USPC ........................................................ 297/337
See application file for complete search history.

(56) References Cited

U.S. PATENT DOCUMENTS

| 6,505,887 | B2 * | 1/2003 | Hampton | B60N 2/06 297/250.1 |
| 7,938,488 | B2 * | 5/2011 | Thiel | B60N 2/0284 297/337 |
| 8,240,764 | B2 * | 8/2012 | Ropp | B60N 2/24 297/337 |
| 10,513,202 | B2 * | 12/2019 | Gumbrich | B60N 2/0284 |

* cited by examiner

*Primary Examiner* — Anthony D Barfield
(74) *Attorney, Agent, or Firm* — Lane & Waterman LLP

(57) ABSTRACT

An apparatus for moving a seat cushion of a seat on which the operator sits includes a seat frame and a pan supporting the seat cushion that is movably supported on the seat frame for movement relative to the seat frame, such as forward-backward or tilting movement. A control panel is mounted to the pan at a forward end of the pan and accessible by the operator while seated on the seat cushion. The control panel includes a housing defining a ledge that is configured so that the operator can grasp underneath the ledge with the operator's hand, with the thumb at an upper face of the control panel. An actuator button is supported on the housing at the upper face of the control panel for actuation by the thumb of the operator while grasping the ledge. A mechanism is connected to the actuator button and is configured and operable upon actuation of the actuator button to permit movement of the pan relative to said seat frame. In one embodiment, two push buttons are provided connected to corresponding extension and tilt mechanisms.

9 Claims, 5 Drawing Sheets

PUSH BUTTON MECHANICAL SEAT ADJUSTMENT CONTROLS

BACKGROUND

The present disclosure concerns controls for adjusting the position of a seat or seat cushion. The controls are particularly suited for vehicle seats.

Many vehicle seats include controls or mechanisms for adjusting the position of the seat or of a seat cushion relative to the frame of the seat. For instance, such controls can permit adjustment of the linear or fore-aft position of the seat or seat cushion, as well as the angle of tilt of the seat or seat cushion. Certain conventional manual controls require the person sitting in the seat to move a lever laterally to extend and/or tilt the seat/cushion. Other conventional manual controls require the person to lift a lever upward in order to permit extension and/or tilting of the seat/cushion. Both conventional manual controls can be awkward for the person to manipulate when seated. Both controls are also cumbersome to operate when the person is not occupying the seat, such as when the person is adjusting the seat before entering the vehicle.

There is a need for a manual control or mechanism for adjusting the position of a seat or seat cushion.

SUMMARY OF THE DISCLOSURE

An apparatus for moving a seat cushion of a seat on which the operator sits includes a seat frame and a pan supporting the seat cushion that is movably supported on the seat frame for movement relative to the seat frame, such as forward-backward or tilting movement. A control panel is mounted to the pan at a forward end of the pan and accessible by the operator while seated on the seat cushion. The control panel includes a housing defining a ledge that is configured so that the operator can grasp underneath the ledge with the operator's hand, with the thumb at an upper face of the control panel. An actuator button is supported on the housing at the upper face of the control panel for actuation by the thumb of the operator while grasping the ledge. A mechanism is connected to the actuator button and is configured and operable upon actuation of the actuator button to permit movement of the pan relative to said seat frame. In one embodiment, two push buttons are provided connected to corresponding extension and tilt mechanisms.

DETAILED DESCRIPTION

Figure 1:
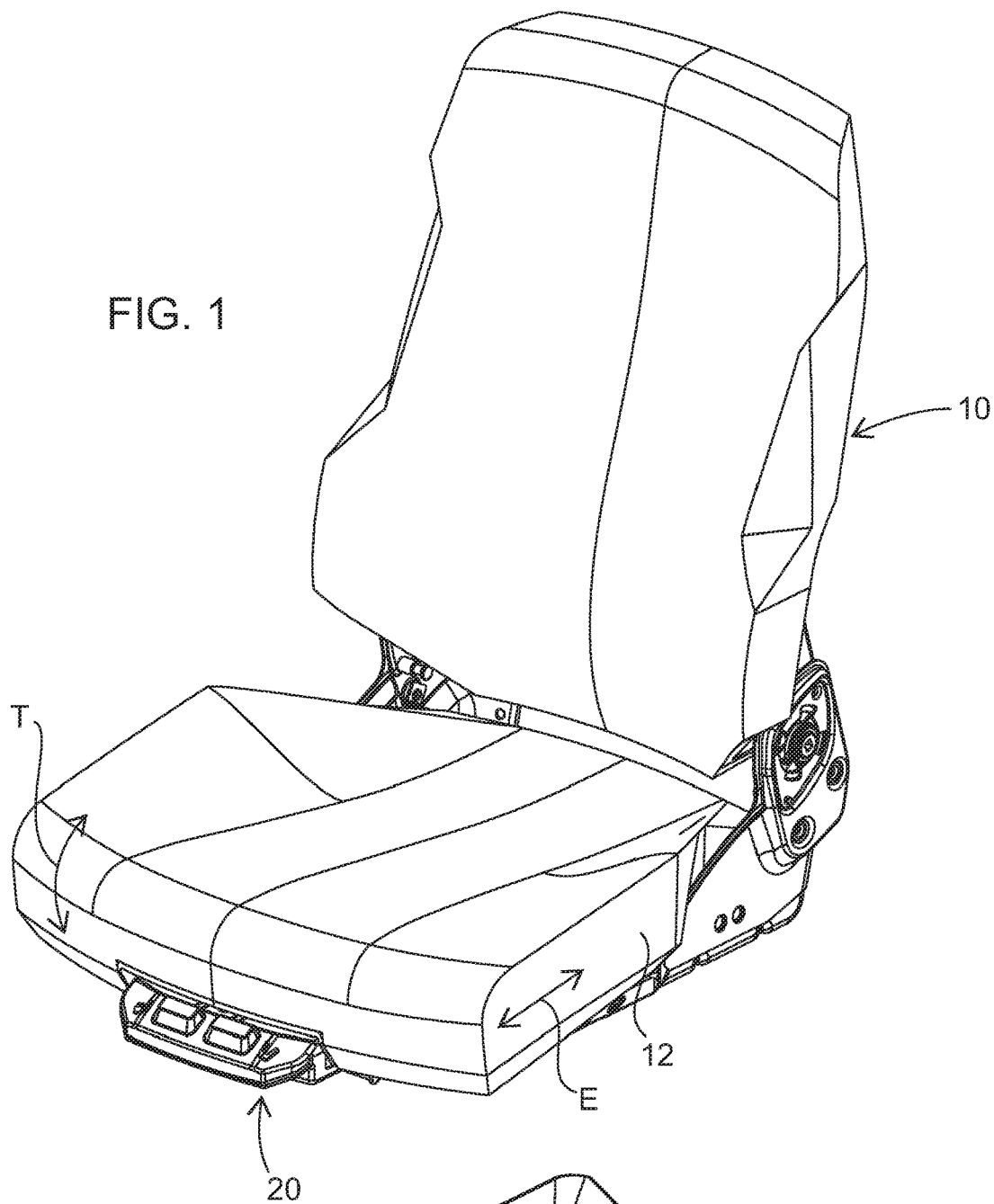
FIG. 1 is a perspective view of a vehicle seat incorporating the manual controls of the present disclosure.
Figure 2:
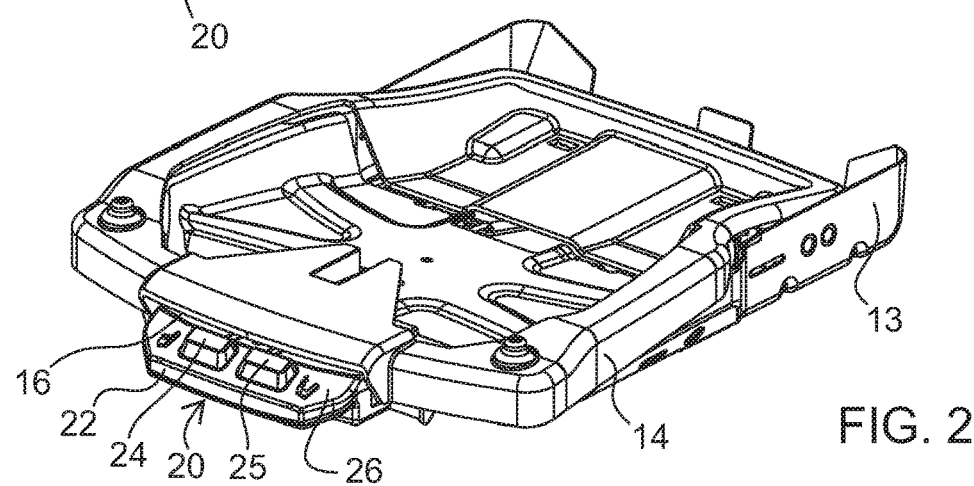
FIG. 2 is a perspective view of a lower portion of the seat in FIG. 1 including the seat pan supporting the seat cushion.
Figure 3:
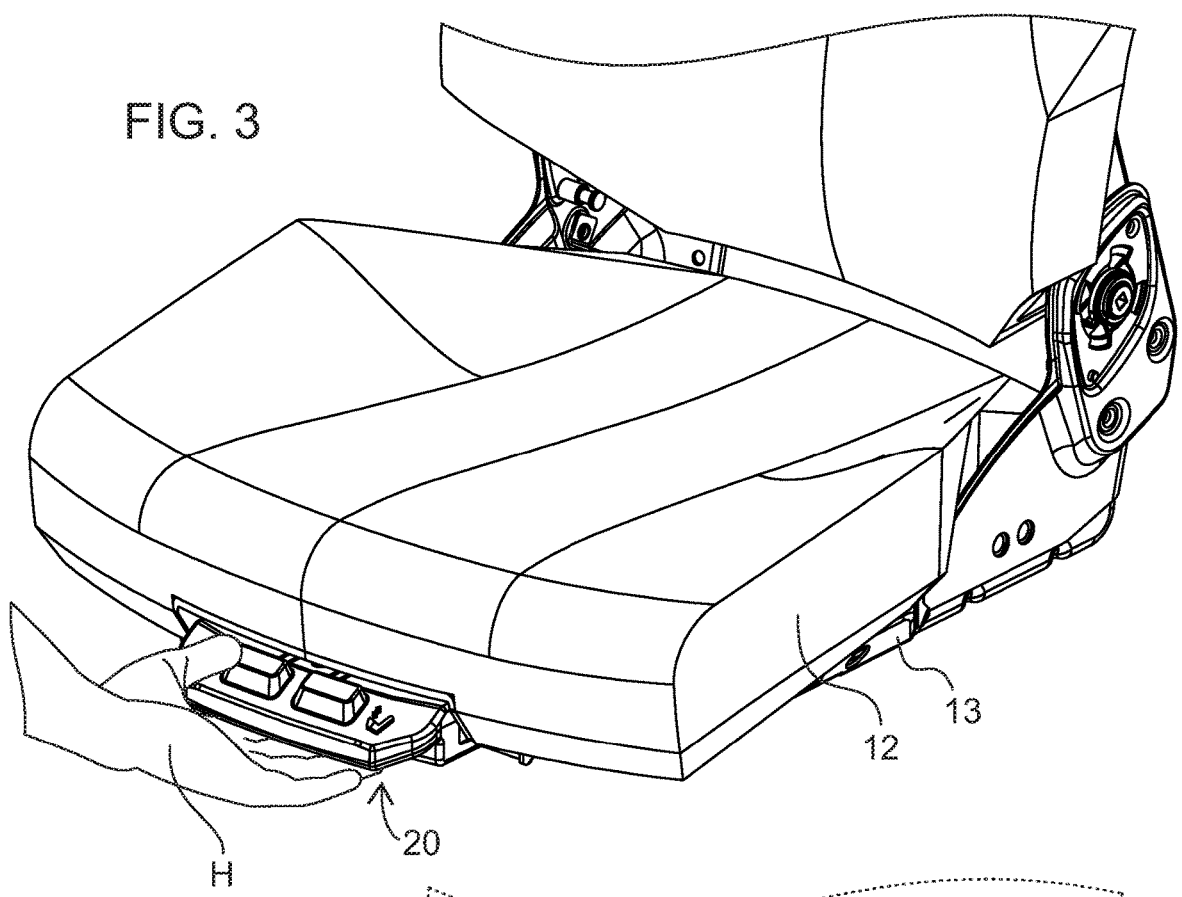
FIG. 3 is a perspective view of a person accessing the manual controls of the present disclosure.
Figure 4:
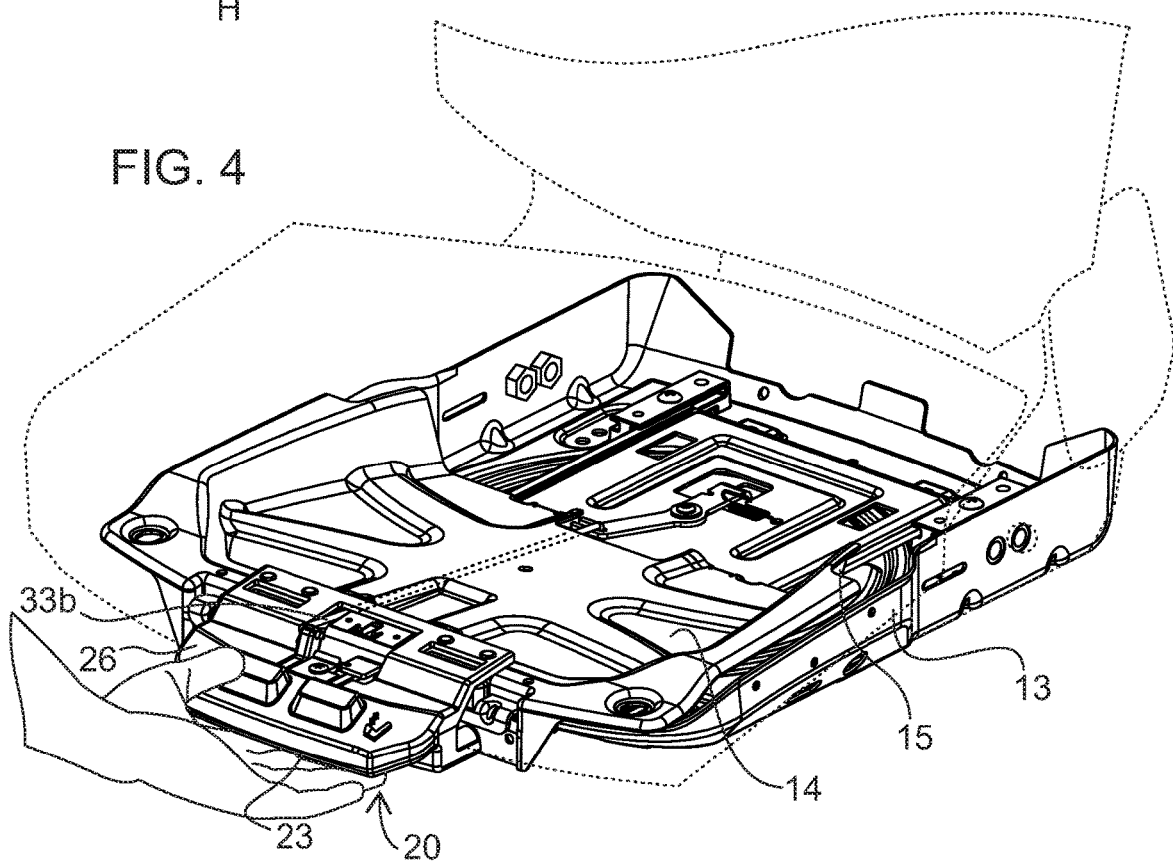
FIG. 4 is the perspective view of FIG. 3 with the seat cushion shown in phantom.
Figure 5:
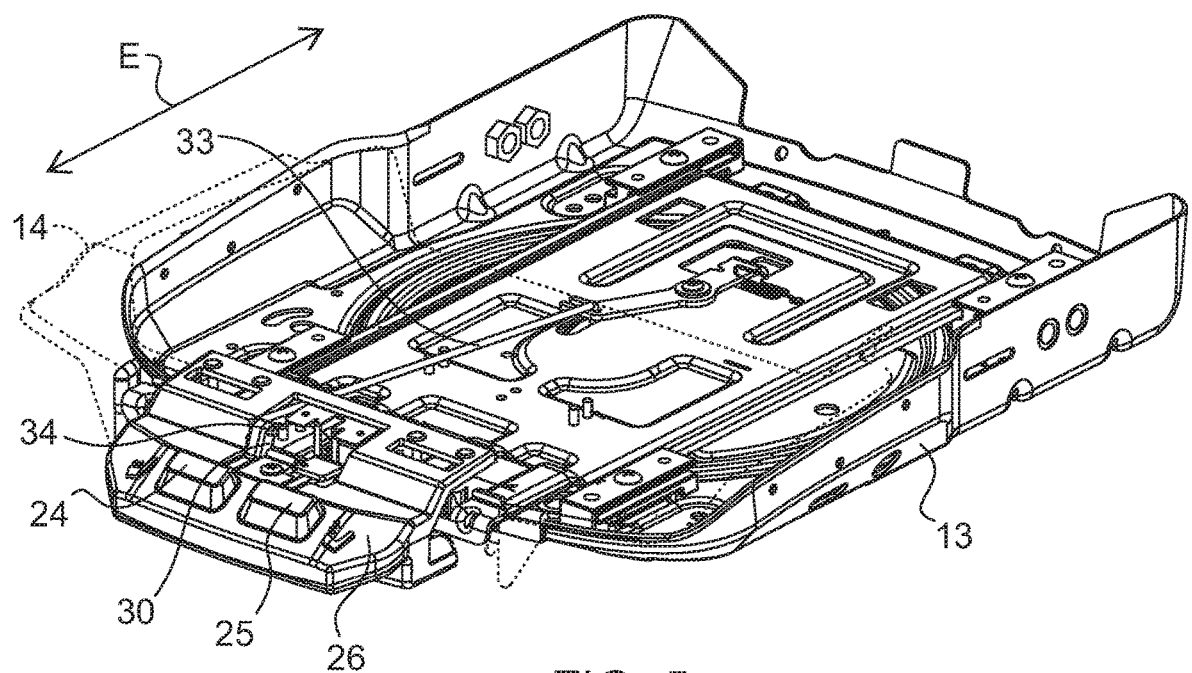
FIG. 5 is a perspective view of the manual controls shown in the previous figures showing the components of the seat extension mechanism.
Figure 7:
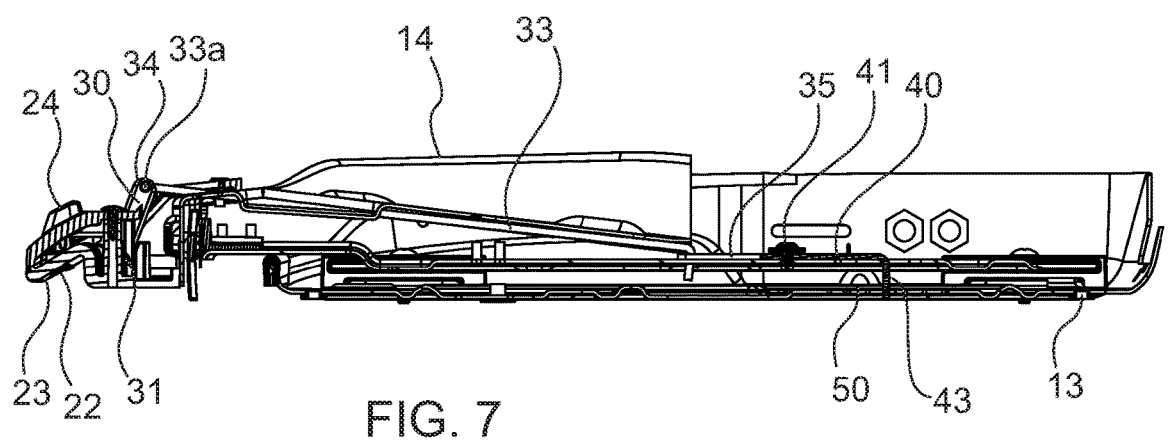
FIG. 7 is a side partial cross-sectional view of the manual controls shown in FIG. 5 with the seat extension mechanism in a normal or non-actuated position.
Figure 8:
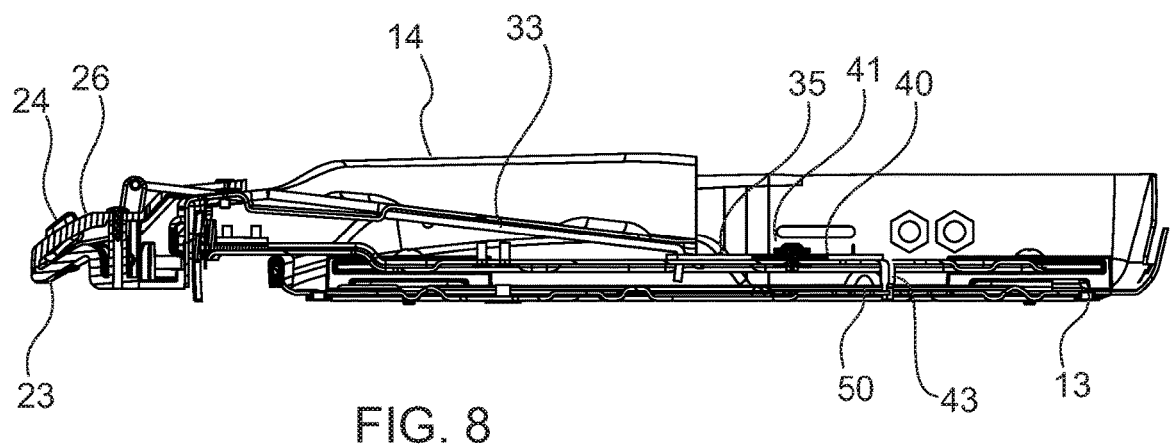
FIG. 8 is the side partial cross-sectional view of FIG. 7 with the seat extension mechanism in the actuated position.
Figure 9:
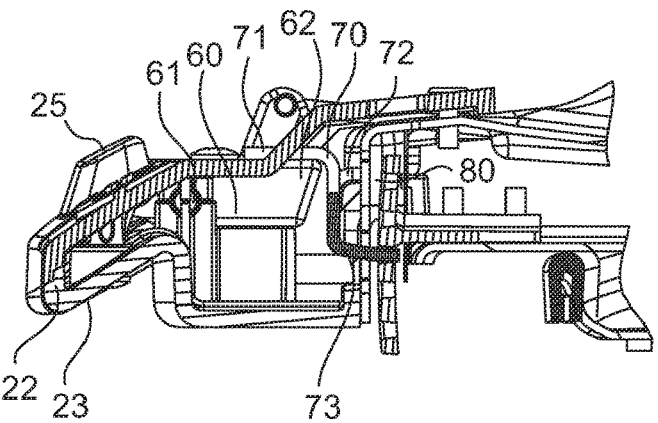
FIG. 9 is an enlarged partial cross-sectional view of the tilt mechanism of the manual controls shown in FIG. 1-4, with the tilt mechanism in a normal or non-actuated position.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains A seat 10 includes a seat cushion 12 (FIG. 1) supported on a cushion pan 14 (FIG. 2). The pan 14 is supported on a frame 13 in a conventional manner so that it can translate or extend forward and retract backward in the direction E and can tilt in the direction T. For instance, the pan 14 can be slidably supported within a track 15 that is pivotably fastened to the frame 13. In accordance with the present disclosure, a control panel 20 is integrated into the seat construction so that the panel is mounted to the cushion pan 14 beneath a recess 16 in the cushion pan. The control panel 20 includes a housing 22 that supports adjustment button 24 for extension adjustment E and button 25 for tilt adjustment T, with the buttons accessible at an upper face 26 of the control panel. As shown in FIGS. 7-9, the control panel 20 is configured so that the housing defines a ledge 23 that the operator can wrap his/her hand H below the ledge while depressing one of the buttons 24, 25 with his/her thumb, as depicted in FIGS. 3-4. The ledge 23 is angled upward from the front of the control panel to allow the operator to easily grasp the housing while seated on the seat 10 or while standing adjacent the seat. The configuration of the ledge allows the operator to use the fingers of the hand H, and even the palm of the hand, for leverage when depressing the adjustment buttons 24, 25. The angled configuration of the ledge also allows the operator to exert a force for pulling the control panel 20, pan 13 and seat cushion 12 forward and/or upward. The operator can exert a force on the front of the housing 22 to push the control panel, pan and cushion backward.

Details of the mechanism actuated by the extension adjustment button 24 are illustrated in FIGS. 5-8. The button 24 is integral with or fixed to a lever arm 30 that is pivotably mounted to the housing 22 at a pivot mount 31. The push button 24 is at one end of the lever arm and the other end of the lever arm, on the opposite side of the pivot mount 31, defines a rod mount 34. An elongated rod 33 is fastened to the rod mount 34 in a suitable manner that allows the rod to rotate relative to the lever arm 30 as the arm is tilted about its pivot mount 31. In one embodiment, the end 33a of the rod is bent and is seated within a collar structure for the rod mount 34. As seen in comparing FIG. 7, in which the button 24 is in its neutral position, with FIG. 8, in which the button has been depressed, the lever arm 30 is pivoted forward and the control rod 33 adopts a different angle relative to the pivot arm. It can also be appreciated that as the button is depressed and the lever arm pivoted, the control rod 33 is pulled forward relative to the seat frame 13.

Figure 6:
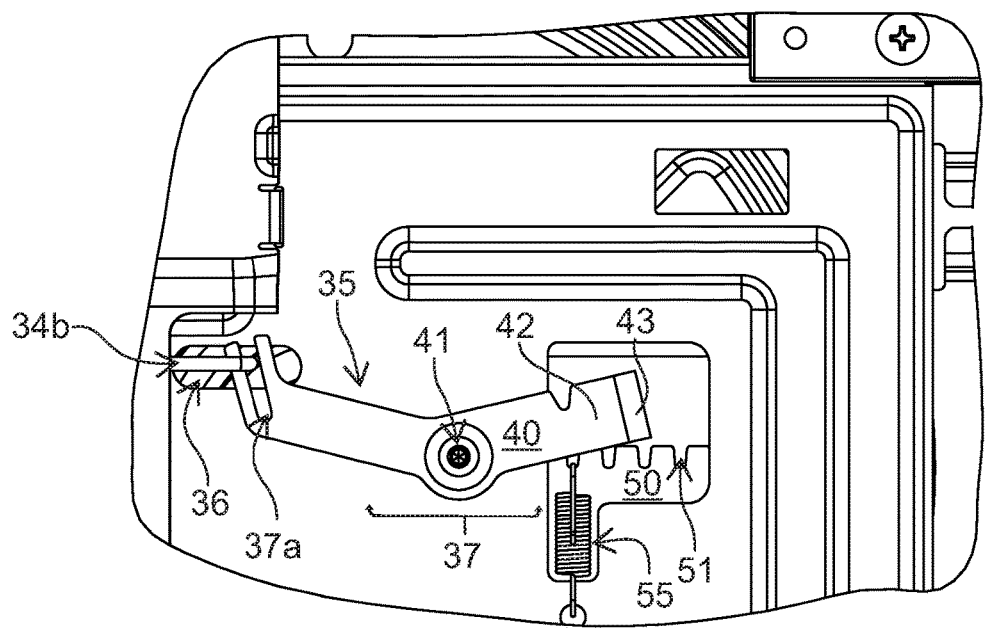
FIG. 6 is an enlarged top view of the latch assembly for the seat extension mechanism shown in FIG. 5.

As shown in the detail view of FIG. 6, the control rod 33 includes an end 34*b* that is bent and seated within an opening 36. A latch actuator 35, disposed at a rearward section of the seat frame 13 where there is room for the latch mechanism (see FIGS. 5, 7), engages end 34*b*. The latch actuator 35 includes an elongated plate 37, where one end of the elongated plate 37 has a notch 37*a* engaged with bent end 34*b* and opposite end of elongated plate 37 terminates in latch member 40. Elongated plate 37 mounted at a pivot mount 41 that is fastened to the cushion pan 14. The latch member includes rearward extending plate portion 42 that terminates in flange 43. The latch member is pivotably mounted on the mount 41 so that the plate portion 42 can pivot in response to movement of notch 37*a*. The latch actuator 35 is shown in its inactivated position in which the plate portion 42 and corresponding flange 43 biased toward a spring 55. To activate, latch actuator 35 is pulled toward the front of the seat so that latch actuator 35 pivots around pivot mount 41 and pulls extending plate portion 42 such that spring 55 stretches. It should be appreciated that when the latch actuator 35 is activated, the pivoting movement occurs to force the plate portion 42 and corresponding flange 43 apart.

When the flange 43 is moved, it engages notches 51 defined in a positioning rack 50 mounted to the frame. Thus, when the flanges are engaged within the notches the seat cushion can no longer move in the extension direction E. It should then be appreciated that when the flanges 43 are disengaged from the positioning rack 50, as shown in FIG. 6, the cushion pan 14 and thus the seat cushion 12 is free to move in the extension direction E relative to the frame 13. It should also be appreciated that the latch actuator is moved forward when the adjustment button 24 is depressed, pulling the control rod 33 and thus the latch actuator 35 by virtue of the connection of the control rod 33 to notch 37*a*.

The extension latch mechanism can be biased to the latched position in which the flanges 43 are engaged in one of the notches 51 in the positioning rack 50. Thus, in one embodiment, the latch actuator 35 is spring biased to its inactivated position.

As shown in the side views of FIGS. 7-8, the latch flanges 43 project downward toward the frame 13. The positioning rack 50 can be a plate with the notches 51 opening laterally inward toward elongated plate 37. Other latch configurations are contemplated that can be operated by movement of the control rod 33.

For example, in another embodiment the latch actuator includes an elongated plate that extends from a collar and terminates in two laterally extending actuator arms. The arms can have rounded ends that are configured to be seated within complementary shaped recesses defined in opposite latch members. The two latch members are mounted at a pivot mount that is fastened to the cushion pan. The latch members include rearward extending plate portions that terminate in flanges. The latch members are pivotably mounted on the mount so that the plate portions can pivot toward or away from each other in response to linear movement of the latch actuator. In their activated position, the latch members have plate portions and corresponding flanges moved toward each other. This position is achieved by pulling the latch actuator toward the front of the seat so that the actuator arms attempt to pull the actuator recess portions of the latch members forward. Since the latch members are pivotably mounted, this forward force applied to the latch members at the recesses manifests in the pivoting movement of the latch members. It should be appreciated that in this embodiment, when the latch actuator is moved rearward toward the latch members, the opposite pivoting movement occurs to force the plate portions and corresponding flanges apart.

The extension latch mechanism can be biased to the latched position in which the flanges are engaged in one of the notches in the positioning racks. In one embodiment, the latch actuator is spring biased to its rearward position. A torsion spring can be provided with its free ends bearing against the pivot mounts and its central body mounted on a post projecting from the plate portion of the latch actuator. In this embodiment, the torsion spring is wound so that the free ends exert an outward force against the pivot mounts, which tends to draw the post, and thus the latch actuator, rearward.

The housing 22 is configured to allow the operator to grasp the housing at the ledge 23 to pull the control pad 20, and therefore the cushion pan 14 forward. Thus, the housing and ledge not only provide an ergonomically efficient way to actuate the extension mechanism, it also provides an ergonomically efficient way to move the seat cushion forward or backward in the extension direction E.

Figure 10:
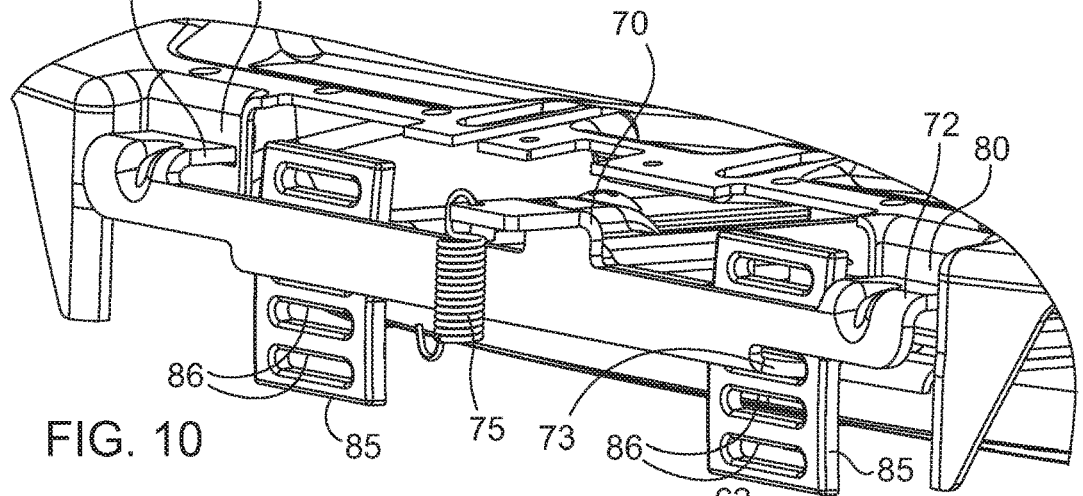
FIG. 10 is a front partial view of the tilt mechanism shown in FIG. 9.
Figure 11:
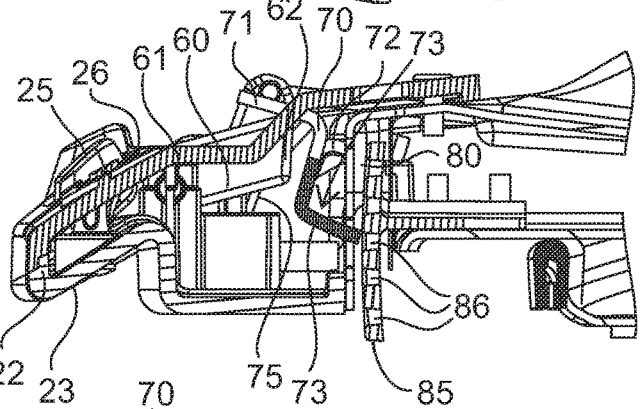
FIG. 11 is the cross-sectional view of FIG. 9 with the seat tilt mechanism in the actuated position.

Details of the tilting mechanism are shown in FIGS. 9-12. The push button 25 that controls the tilt mechanism is integral with or fastened to the forward end of a lever arm 60. The lever arm is pivotably mounted to the housing 22 at a pivot mount 61. The pivot mount 61 is near the push button 25 to provide a mechanical advantage when the button is depressed. The lever arm 60 is an elongated plate with the actuation end 62 on the opposite side of the pivot mount from the button 25, as shown in FIG. 9. The actuation end 62 is seated underneath a lever plate 71 of a latch bracket 70. In its neutral position shown in FIG. 9, the lever plate 71 essentially rests horizontally on the actuation end 62 of the lever arm 60. However, when the button 25 is depressed, the actuation end 62 elevates, as shown in FIG. 11, which dislodges the lever plate 71 from its horizontal position, causing the latch bracket 70 to pivot.

Figure 12:
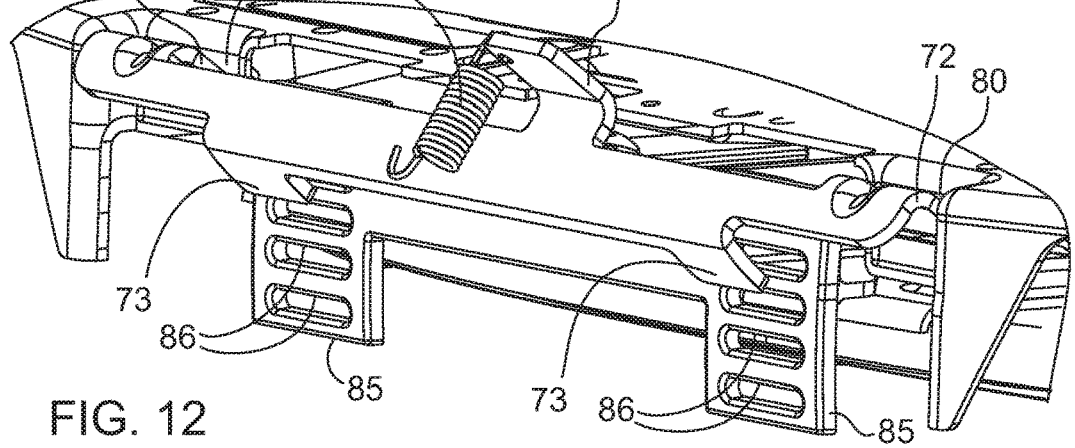
FIG. 12 is the view of FIG. 10 with the seat tilt mechanism in the actuated position.

In the present embodiment, the latch bracket 70 is not specifically mounted or fixed to any structure but is instead essentially free-floating between structure fixed to the seat frame 13 and the lever arm 60. The latch bracket 70 is an elongated bracket, as shown in FIGS. 10, 12, with the lever plate 71 located in the center of the bracket. The opposite ends of the bracket are bent rearward to define fulcrum plates 72 that are initially seated on a fulcrum mount 80 fastened to the seat frame, as shown in FIG. 9. When the lever plate 71 is dislodged by the lever arm 60, the bracket 70 essentially pivots about point of contact between the rear edge of the fulcrum plate 72 and the fulcrum mount 80, as depicted in FIG. 11.

The tilt mechanism includes a pair of latch plates 85 fastened to the seat frame. The latch plates 85 are vertically mounted and slightly curved to correspond to the movement of the seat cushion pan as it is tilted relative to the frame. The latch plates define several latch slots 86 that are spaced apart at discrete intervals corresponding to predetermined angles of tilt for the seat cushion. The latch bracket 70 includes a pair of latch arms 73 that project inward from the body of the bracket. The latch arms are sized to slide into one of the latch slots, as shown in FIGS. 9-10. Thus, in the neutral position the latch arms are within a corresponding one of the latch slots to hold the seat at the desired angle of tilt. When it is desired to modify the tilt angle, the button 25 is depressed, which pivots the lever arm 60 upward, which in turn dislodges the lever plate 71 causing the latch bracket 70 to pivot about the fulcrum plates 72. This pivoting movement dislodges the latch arms 73 from the latch slots 81, as shown in FIGS. 11-12. When the latch arms are free of the latch slots, the entire control panel 20 can be moved up and down to tilt the cushion pan 14.

Although the tilt mechanism can be biased by gravity acting on both the lever arm 60 and latch bracket 71, in one embodiment the latch bracket 70 is spring biased to the neutral position shown in FIGS. 9-10. A bias spring 75 is fastened at one end to one side of the lever plate 71 and at its opposite end to the housing 22.

The housing 22 is configured to allow the operator to grasp the housing at the ledge 23 to pull the control pad 20, and therefore the cushion pan 14, upward to tilt the seat cushion. The downward tilting movement can be assisted by gravity, but the ability of the operator to grasp the ledge 23 allows the operator to control the downward movement, even when seated on the seat 10. Thus, the housing and ledge not only provide an ergonomically efficient way to actuate the tilting mechanism, it also provides an ergonomically efficient way to tilt the seat cushion forward in the tilt direction T.

The present disclosure should be considered as illustrative and not restrictive in character. It is understood that only certain embodiments have been presented and that all changes, modifications and further applications that come within the spirit of the disclosure are desired to be protected.

What is claimed is:

1. An apparatus for moving a seat cushion of a seat on which the operator sits, comprising:
    a seat frame;
    a pan supporting the seat cushion and movably supported on the seat frame for movement relative to the seat frame;
    a control panel mounted to the pan at a forward end of the pan and accessible by the operator while seated on the seat cushion, the control panel including a housing defining a ledge configured to be grasped underneath the ledge by the operator's hand with the thumb at an upper face of the control panel;
    an actuator button supported on the housing at the upper face of the control panel for actuation by the thumb of the operator while grasping the ledge; and
    a mechanism connected to said actuator button, said mechanism configured and operable upon actuation of said actuator button to permit movement of said pan supporting the seat cushion relative to said seat frame.

2. The apparatus of claim 1, wherein said mechanism is configured and operable to prevent and permit movement of said pan forward and backward relative to said seat frame upon actuation of the actuator button, or is configured and operable to prevent and permit tilting of said pan relative to said seat frame upon actuation of the actuator button.

3. The apparatus of claim 1, further comprising:
    a second actuator button supported on said housing;
    said mechanism is configured and operable to prevent and permit movement of said pan forward and backward relative to said seat frame upon actuation of the first actuator button; and
    a second mechanism connected to said second actuator button, said second mechanism configured and operable to prevent and permit tilting of said pan relative to said seat frame upon actuation of the corresponding actuator button.

4. The apparatus of claim 3, wherein:
    said second actuator button is connected to one end of an elongated second lever arm, said second lever arm including an opposite actuation end and pivotably mounted to said housing at a position between said second actuator button and said actuation end, said second lever arm pivoting the actuation end from a neutral position to a release position when said second actuator button is depressed; and
    said second mechanism includes;
        a latch plate fastened to said seat frame and including a plurality of vertically arranged slots; and
        a latch bracket disposed between said actuation end of said second lever arm and said latch plate, said latch bracket including a lever plate contacting said actuation end of said second lever arm, a fulcrum plate bearing against a fulcrum mount fastened to said seat frame, and a latch arm configured to be received within one of said plurality of vertically arranged slots, said latch bracket arranged to pivot about said fulcrum mount by said fulcrum plate when said actuation end is pivoted to its release position, whereby said latch arm is not received within a slot.

5. The apparatus of claim 4, wherein said second mechanism includes:
    a second latch plate fastened to said seat frame offset from said latch plate and including a plurality of vertically arranged slots; and
    said latch bracket includes a second fulcrum plate bearing against a second fulcrum mount fastened to said set frame, and a second latch arm configured to be received within one of said plurality of vertically arranged slots of said second latch plate, said latch bracket arranged to pivot about said fulcrum mount and said second fulcrum mount by said actuation end when said first and second fulcrum plates when said actuation end is pivoted to its release position, whereby said latch arm and said second latch arm are not received within a slot.

6. The apparatus of claim 4, wherein said second mechanism includes a biasing spring mounted between said lever plate and said housing of said control panel, said biasing spring configured to bias said latch bracket to a neutral position in which said latch arm is received in one of said plurality of vertically arranged slots.

7. The apparatus of claim 1, wherein:
    said mechanism is biased to a neutral position in which movement of said pan relative to said seat frame is prevented; and
    said actuator button is configured upon actuation to move said at least one mechanism from said neutral position.

8. The apparatus of claim 1, wherein:
    said actuator button is connected to a lever arm pivotably mounted to said housing, said lever arm pivotable from a neutral position to a release position when said actuation button is depressed; and
    said at least one mechanism includes;
        a positioning rack attached to said seat frame and defining a plurality of notches;
        an elongated latch member including a flange at one end configured to be selectively received within one of said plurality of notches and a recess at an opposite end, said latch member pivotably mounted to said pan at a location between said flange and said recess to pivot between a neutral position in which said flange is received within one of said plurality of notches and a released position in which said flange is not received within any of said plurality of notches, whereby said pan can translate forward and backward relative to said seat frame;

a latch actuator including an arm arranged to be received within said recess while said latch member pivots relative to said pan, said latch actuator arranged to translate relative to said pan from a neutral position to a release position; and a control rod connecting said latch actuator to said lever arm so that when said lever arm is pivoted to said release position said control rod pulls said latch actuator from its neutral position to its release position and said arm causes said latch member to pivot from its neutral position to its released position.

9. The apparatus of claim 8, further comprising a biasing spring engaged between said pan and said actuator to bias said latch actuator to its neutral position.

\* \* \* \* \*